No. 851,631. PATENTED APR. 23, 1907.
C. F. SWANSON.
EGG LIFTER.
APPLICATION FILED MAY 18, 1906.
2 SHEETS—SHEET 1.
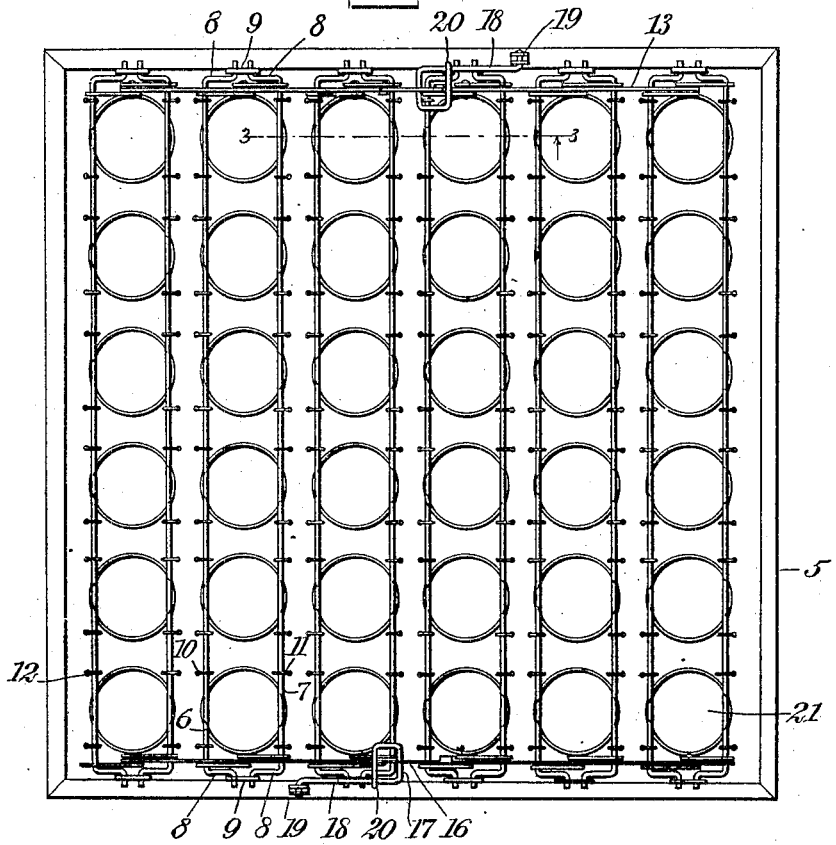
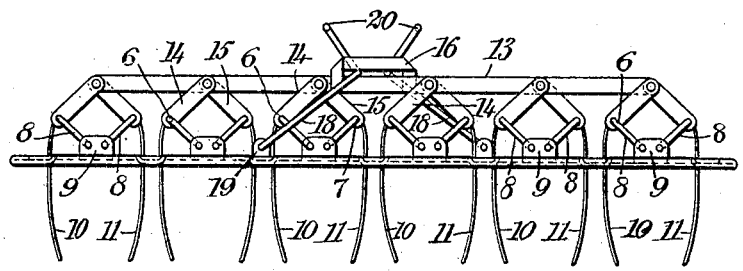
WITNESSES
L. Almquist
C. R. Ferguson
INVENTOR
Carl F. Swanson
BY Munn & Co
ATTORNEYS No. 851,631. PATENTED APR. 23, 1907.
C. F. SWANSON.
EGG LIFTER.
APPLICATION FILED MAY 18, 1906.
2 SHEETS—SHEET 2.
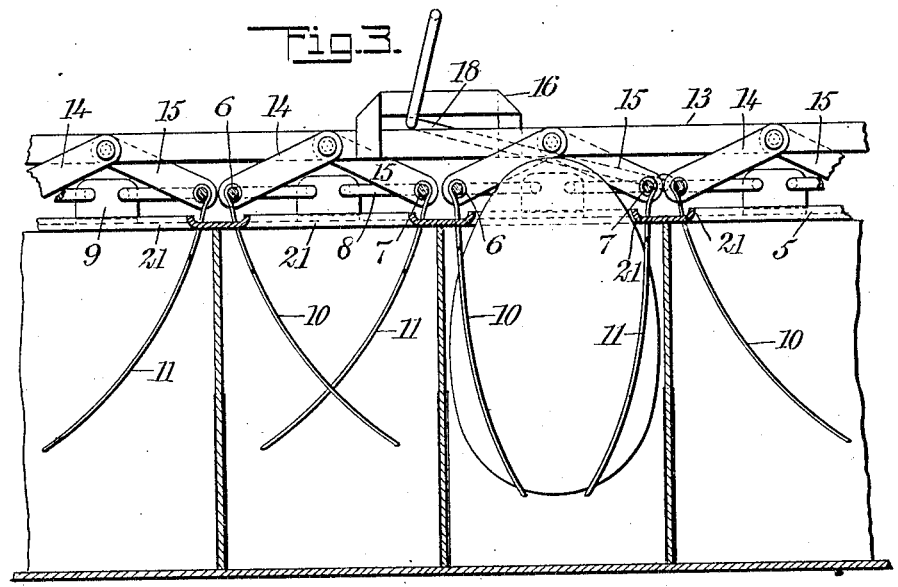
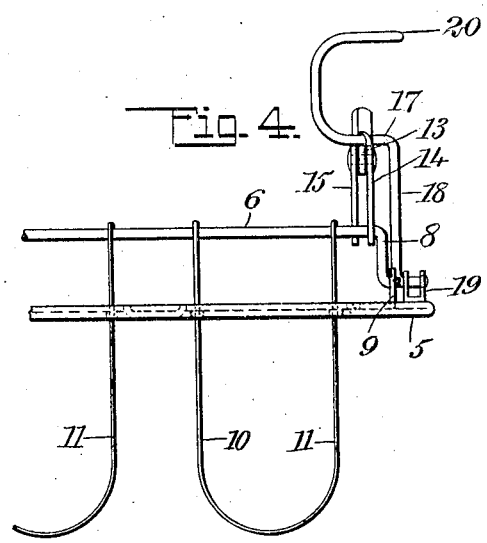
WITNESSES
INVENTOR
Carl F. Swanson
BY
ATTORNEYS

UNITED STATES PATENT OFFICE.

CARL F. SWANSON, OF EAGLE BEND, MINNESOTA, ASSIGNOR OF FIFTY ONE-HUNDREDTHS TO HIMSELF AND FIFTY ONE-HUNDREDTHS TO JOSEPH M. ANDERSON, OF EAGLE BEND, MINNESOTA.

EGG-LIFTER.

No. 851,631.  Specification of Letters Patent.  Patented April 23, 1907.

Application filed May 18, 1906. Serial No. 317,538.

*To all whom it may concern:*

Be it known that I, CARL F. SWANSON, a citizen of the United States, and a resident of Eagle Bend, in the county of Todd and State of Minnesota, have invented a new and Improved Egg-Lifter, of which the following is a full, clear, and exact description.

This invention relates to improvements in devices for lifting eggs from a crate for the purpose of transferring the eggs to a tester, and returning the same to the crate after testing, the object being to provide a device of this character that will be simple in construction and by means of which all of the eggs in a layer in the crate may be simultaneously picked up.

I will describe an egg tester embodying my invention and then point out the novel features in the appended claims.

Reference is to be had to the accompanying drawings forming a part of this specification, in which similar characters of reference indicate corresponding parts in all the views.

Figure 1 is a plan of an egg lifter embodying my invention; Fig. 2 is a side view thereof; Fig. 3 is a section on the line 3—3 of Fig. 1, showing the device as in operation or in connection with a portion of an egg case; and Fig. 4 is a detail front view.

The device comprises a plate 5 of any suitable material, such for instance, as metal, and supported on the plate are rock shafts arranged in pairs as indicated at 6 and 7. The rock shafts have crank ends 8, the horizontally-disposed portions thereof having bearings in lugs 9 on the plate. Attached to the shafts 6 and 7 of each pair, are opposite loops 10, 11, consisting of spring-yielding wire; and these loops pass downward through perforations 12 in the plate, the walls of the perforations forming fulcrums to cause the loops of a pair to move toward and from each other as the rock shafts are operated by the means to be described. This means consists of bars 13 at opposite sides of the plate, and these bars have link connections 14, 15, with the respective rock shafts 6 and 7 of a pair.

On each bar 13 at about its center is a guide-loop 16 for receiving the horizontally-disposed portion 17 of a lever 18 having swinging connection with lugs 19 on the said plate 5.

It will be noted that the opposite levers 18 are inclined in reverse directions so that a person may by grasping the handle portions 20, conveniently operate the levers to raise or lower the portions 13. The plate 5 between the loops of a pair, is provided with openings 21 through which the ends of the eggs may pass as indicated in Fig. 3, so that the eggs may be inspected or tested when placed in a tester.

In operation, by moving the bar 13 upward, through the manipulation of the levers, the loops in each pair will be spread apart so that they may be readily passed down over the eggs; this position of the loops is indicated in Fig. 2. After engaging the loops over the eggs, the bars 13 are to be moved downward through the medium of the levers, causing the loops to engage closely with the eggs, but as said loops are of comparatively small and resilient wire, there will be no danger of breaking the eggs.

Having thus described my invention, I claim as new and desire to secure by Letters Patent:

1. An egg lifter, comprising a plate having openings and also having perforations, a plurality of pairs of rock shafts mounted on the plate, loops attached to the rock shafts and having their members extended through said perforations, and means for causing movements of the rock shafts.

2. An egg lifter, comprising a plate having openings and perforations, a plurality of pairs of rock shafts provided with crank ends, having swinging connection with said plate, wire loops attached to the rock shafts and having their members extended through the perforations in the plate, operating bars at opposite sides of the plate, link connections between said bars and the rock shafts, whereby the rock shafts of the bar may be moved in opposite directions, and means for operating said bars.

3. An egg lifter, comprising a plate having openings and perforations, a plurality of pairs of rock shafts provided with crank ends having swinging connection with the plate, spring-yielding loops extended from the rock shafts through the perforations in the plate, operating bars at opposite sides of the plate, link connections between said bars and the rock shafts, whereby the rock shafts of a pair are swung in opposite directions when the said bars are moved upward or downward, guides on the bars and swinging levers having bars engaging in said guides.

In testimony whereof I have signed my name to this specification in the presence of two subscribing witnesses.

CARL F. SWANSON.

Witnesses:
J. M. ANDERSON,
J. E. ROMAN.